UNITED STATES PATENT OFFICE.

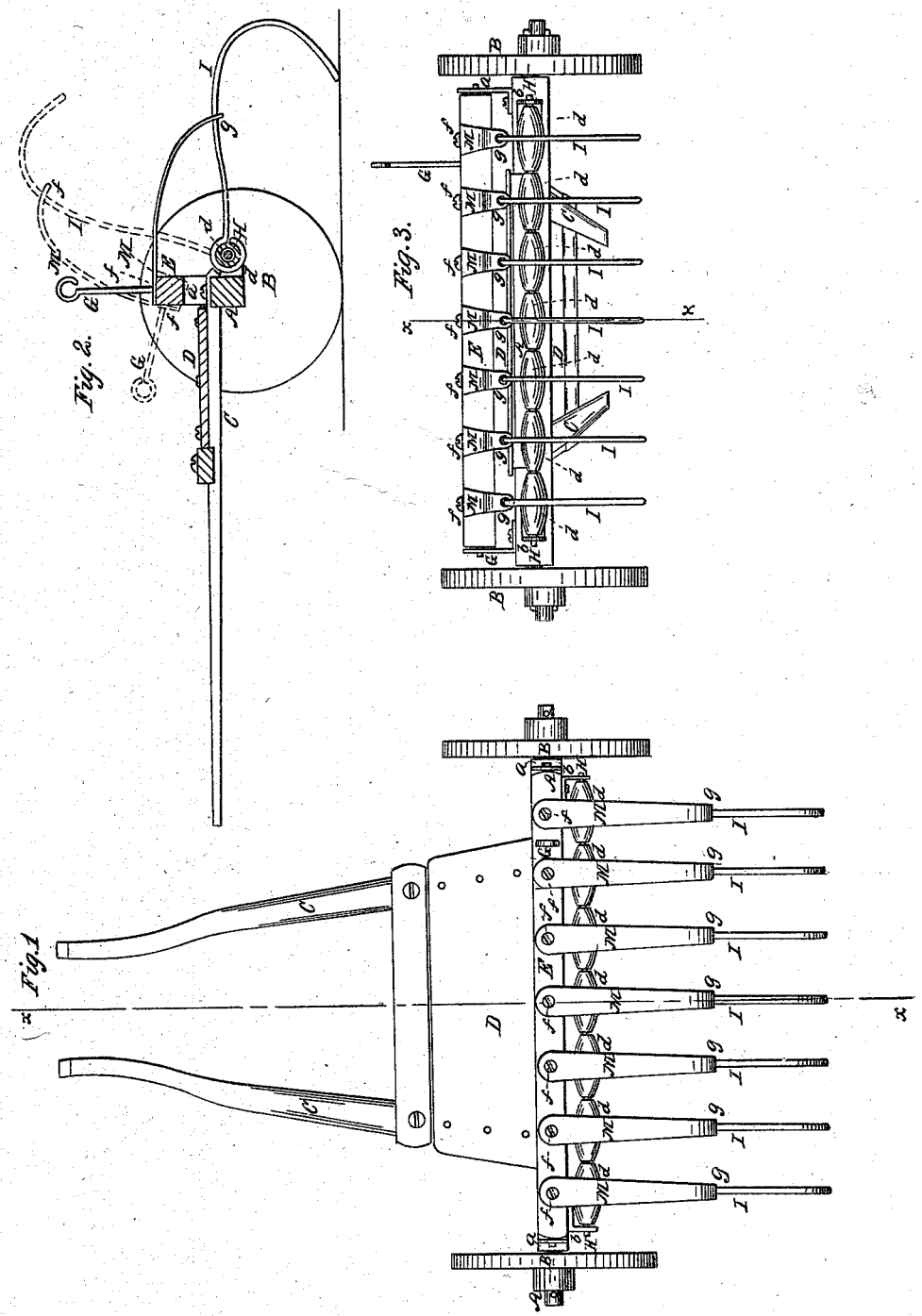

JOHN Q. ADAMS, OF HIGHSPIRE, PENNSYLVANIA.

IMPROVEMENT IN HORSE-RAKES.

Specification forming part of Letters Patent No. 35,428, dated June 3, 1862.

*To all whom it may concern:*

Be it known that I, JOHN Q. ADAMS, of Highspire, in the county of Dauphin and State of Pennsylvania, have invented a new and Improved Horse-Rake; and I do hereby declare that the following is a full and exact description thereof, reference being had to the accompanying drawings, making part of this specification—

Figure 1 being a plan of the rake; Fig. 2, a vertical section thereof in the plane indicated by the line $x\ x$, Figs. 1 and 3; Fig. 3, a rear view of the same.

Like letters designate corresponding parts in all the figures.

A simple axle, A, of the desired length, mounted on wheels B B, and provided with shafts C C and driver's platform D, is employed for mounting the rake upon.

Projecting from the rear of the axle A are ears or bearings $b\ b$, in which turns a pivot-rod or shaft, H. On this rod are strung hub-blocks $d\ d$, substantially as represented, each one of which is wound with a wire rake-tooth, I, so that either may be raised singly or all together. Similar ears or bearings, $a\ a$, project upward from the top of the axle A, and in these bearings turn the journals of another shaft or roller, E, substantially as represented in the drawings.

On the top of the roller E is rigidly secured a set of plates, M M—one for each rake-tooth I—by means of screws $f f$ or other equivalent means. These plates are more or less elastic, but at the same time rigid enough to answer their purpose perfectly. They reach back, say, one-half of the length of the rake-teeth I I, respectively, in positions directly over said teeth; and the rear end of each plate is provided with an eye, $g$, through which the corresponding rake-tooth is inserted. The eyes are just large enough to allow the rake-teeth to freely slide therein.

The roller E is provided with a handle, G, by which the attendant turns the same in its bearings and otherwise controls it.

The use of the spring-plates M M or their equivalents, arranged as above, is, first, to hold the teeth down to the ground so near to the rear ends thereof as to enable them to hold the hay firmly and securely without requiring nearly so much strength and rigidity as they would without the plates; and, second, to lift all the rake-teeth together by simply drawing forward the handle G, and thereby turning the roller E. At the same time the rake-teeth I I yield singly to any obstruction on the ground with perfect freedom. The attendant is also enabled to cause the rake-teeth to bear on the ground with increased force when necessary by pressing back the handle G. As the rake-teeth are raised or lowered they slide in the eyes $g\ g$ of the spring-plates M M to accommodate the different relative positions of the spring-plates and rake-teeth, occasioned by their turning on different centers. By thus hinging the rake teeth directly behind the axle A the horse draws them straight forward without having any tendency to strain them or to cause them to rise from the ground. This I am enabled to do by employing the spring-plates M M, which turn on a shaft above the axle to raise the rake-teeth by, as well as to press them down by.

My improved horse-rake, constructed as above described, is extremely simple, cheap, strong, convenient, and effectual in every respect.

What I claim as my invention, and desire to secure by Letters Patent, is—

The combination of the spring-plates M M with the rake-teeth I I, when turning on a separate shaft or axis from said rake-teeth for the double purpose of holding the rake-teeth down more firmly and of raising them from the ground when required, substantially as herein specified.

In witness whereof I hereunto set my hand this 28th day of March, 1861.

J. Q. ADAMS.

Witnesses:
H. C. ALLEMAN,
F. K. BOAL.